United States Patent [19]
Warde et al.

[11] Patent Number: 5,471,341
[45] Date of Patent: Nov. 28, 1995

[54] MEMBRANE LIGHT MODULATING SYSTEMS

[75] Inventors: Cardinal Warde, Newtonville; Thomas N. Horsky, Acton; Craig M. Schiller, Arlington; George J. Genetti, Beverly, all of Mass.

[73] Assignee: Optron Systems, Inc., Bedford, Mass.

[21] Appl. No.: 168,760

[22] Filed: Dec. 16, 1993

Related U.S. Application Data

[62] Division of Ser. No. 734,289, Jul. 17, 1991, Pat. No. 5,287,215.

[51] Int. Cl.⁶ .................................................. G02B 26/00
[52] U.S. Cl. ............................................. 359/293; 359/295
[58] Field of Search ...................................... 359/291, 292, 359/293, 295, 298, 262

[56] References Cited

U.S. PATENT DOCUMENTS

| | | | |
|---|---|---|---|
| 3,463,572 | 8/1969 | Preston, Jr. | 369/295 |
| 3,667,830 | 6/1972 | Rottmiller | 359/293 |
| 3,701,586 | 10/1972 | Goetz | 359/295 |
| 3,746,785 | 7/1973 | Goodrich | 359/291 |
| 4,001,635 | 1/1977 | d'Auria et al. | 359/291 |
| 4,087,810 | 5/1978 | Hung et al. | 359/291 |
| 4,752,714 | 6/1988 | Sonneborn et al. | 313/429 |
| 4,902,110 | 2/1990 | Green | 359/275 |
| 5,214,347 | 5/1993 | Gray | 313/355 |
| 5,237,180 | 8/1993 | Anagnostopoulos et al. | 250/423 |

FOREIGN PATENT DOCUMENTS

| | | | |
|---|---|---|---|
| 0046873 | 3/1982 | European Pat. Off. | G02F 1/19 |
| 0139991 | 5/1985 | European Pat. Off. | G09F 9/37 |

*Primary Examiner*—Georgia Y. Epps
*Assistant Examiner*—Thomas Robbins
*Attorney, Agent, or Firm*—Hayes, Soloway, Hennessey, Grossman Hage

[57] ABSTRACT

A membrane light modulator comprising a charge transfer plate, and having a multiplicity of conductors extending from the rear surface to the front surface of the plate. The conductors are supported in an insulating matrix. The front side of the transfer plate has a plurality of potential wells defined by insulating walls, each potential well constituting a pixel. A plurality of conductors is provided for each pixel. A deformable reflecting membrane comprising a metal layer spans the potential wells. An electric potential is provided on the metal layer, and a source of electrons is provided for impacting the rear surface of the charge transfer plate.

9 Claims, 8 Drawing Sheets

MEMBRANE LIGHT MODULATING SYSTEMS

This is a divisional of application Ser. No. 07/734,289 filed on Jul. 17, 1991, now U.S. Pat. No. 5,287,215.

BACKGROUND OF THE INVENTION

Spatial light modulators (SLMs) have numerous potential technical applications such as multispectral infrared target simulation, projection television systems, and optical computer systems. First introduced by Preston in 1968, deformable membrane mirror light modulators (MLMs), which incorporate a highly reflective membrane as the light modulating element, have generated interest within the applied optics community as good candidates for both adaptive optics and projection display applications. Various means of addressing the two-dimensional deformable membrane mirror have been demonstrated, including electron beam-addressing, optical addressing, and electrical addressing via integrated circuits. These devices have not progressed beyond the development state, hence there are no MLMs on the commercial market. The electron beam-addressed approach is preferred for display applications due to the high resolution and convenience of direct video addressing; however, development of suitable substrates which would decouple the electron beam interaction region from the reflective mirror were lacking. One method of solving this problem is by introducing the charge-transfer plate (CTP) as a means of providing both structural integrity and electrical signal transfer to the mirror elements. This approach has improved the state-of-the-art by yielding a device with a large number of resolution elements, high contrast, and low voltage operation. (see U.S. Pat. No. 4,794,296 assigned to the assignee of this application)

Such a system is shown in FIG. 18 of the above referenced '296 patent and is more particularly described on column 15, lines 21 through 38 thereof. The charge transfer plate creates a two-dimensional electric field which produces a local displacement of the metalized reflective membrane to provide local modulation of the phase output of the two-dimensional light signal reflected from the mirror. These SLMs exhibit very fast response times, can be read out with high optical efficiency, and in principle can incorporate a very large number of resolution elements. Since a deformable mirror SLM is essentially a two-dimensional phase modulating element with a large phase dynamic range, it is well-suited to adaptive optics applications such as wavefront correction, laser beam steering and phase only spatial filtering. With appropriate pixelization of the membrane surface, intensity modulation may be accomplished via the schlieren readout schemes employed by projection display systems such as the Eidophor (G.E.) and the γ-Ruticon (Xerox).

Recent improvements in the MLM and the system for modulating the charge thereon have involved a MLM wherein a membrane is deposited over an array of wells with an addressable electrode at the bottom of each well. Thus, the well and its electrode define an individual pixel. The membrane is coated with a thin light reflecting electrode material held at a static potential. A pixel is activated by establishing a potential difference between the well electrode and the membrane electrode, causing the membrane to deform into the well region in response to electrostatic forces. Hence, the pixel driving voltage induces a local phase modulation on the readout wavefront reflected by the membrane mirror surface. Such a system is described in "Electron Beam Addressed Membrane Light Modulator", Spatial Light Modulators and Applications, 1990 Technical Digest Series, Vol. 14, Optical Society of America, Sept. 1990.

BRIEF SUMMARY OF THE INVENTION

In one preferred form of the invention a membrane light modulator utilizes a charge transfer plate membrane anode assembly. The charge transfer plate which has a multiplicity of conductors extending from the rear surface to the front surface of the plate. The conductors are supported in an insulating matrix and the front side of the transfer plate has a plurality of recessed wells defined by insulating walls, each recessed well constituting a pixel. A plurality of conductors are preferably provided for each pixel and a metal electrode in the bottom of each recessed well preferably spans a plurality of the conductors. The rear surface of the plate preferably includes a secondary electron-enhancing coating. A deformable reflecting metal surface spans the recessed wells. This metal surface can comprise a thin sheet of unsupported metal, but is preferably formed of a metalized coating on a thin insulating (e.g. plastic) support.

In another form of the invention, the anode assembly is such that the support for the mirror membrane is still a plurality of insulating walls defining potential wells with an electrode on the bottom of each potential well. However, the potential wells are not part of a charge transfer plate and the electron beam directly addresses the mirror membrane to modify the charge thereon by either electron depletion or electron accretion.

In addition to electron beam addressing of these anode structures with a cathode ray tube, optical addressing by means of a photocathode and microchannel plate assembly, field emitter array or hard-wire addressing are also possible for each of the anode structures cited herein.

DETAILED DESCRIPTION OF THE INVENTION

In order to more fully comprehend the invention reference should be had to the following detailed description of several preferred forms of the invention taken in connection with the attached drawings herein:

FIG. 4b is the light distribution showing the sixfold symmetry of the Fourier transform of the membrane mirror of 4a.

The membrane light modulator of the present invention can be used in a number of applications. These involve various types of high definition display techniques, such as high definition television projection, infrared target simulation, as well as other light modulating systems wherein the spatially modulated light is input to another device, for example, an optical computer. For simplicity, the invention will be initially described in its preferred form where it is used as an ultraviolet, visible or IR image projector. This initial description is not intended to limit the scope of the invention in any way.

Figure 1:
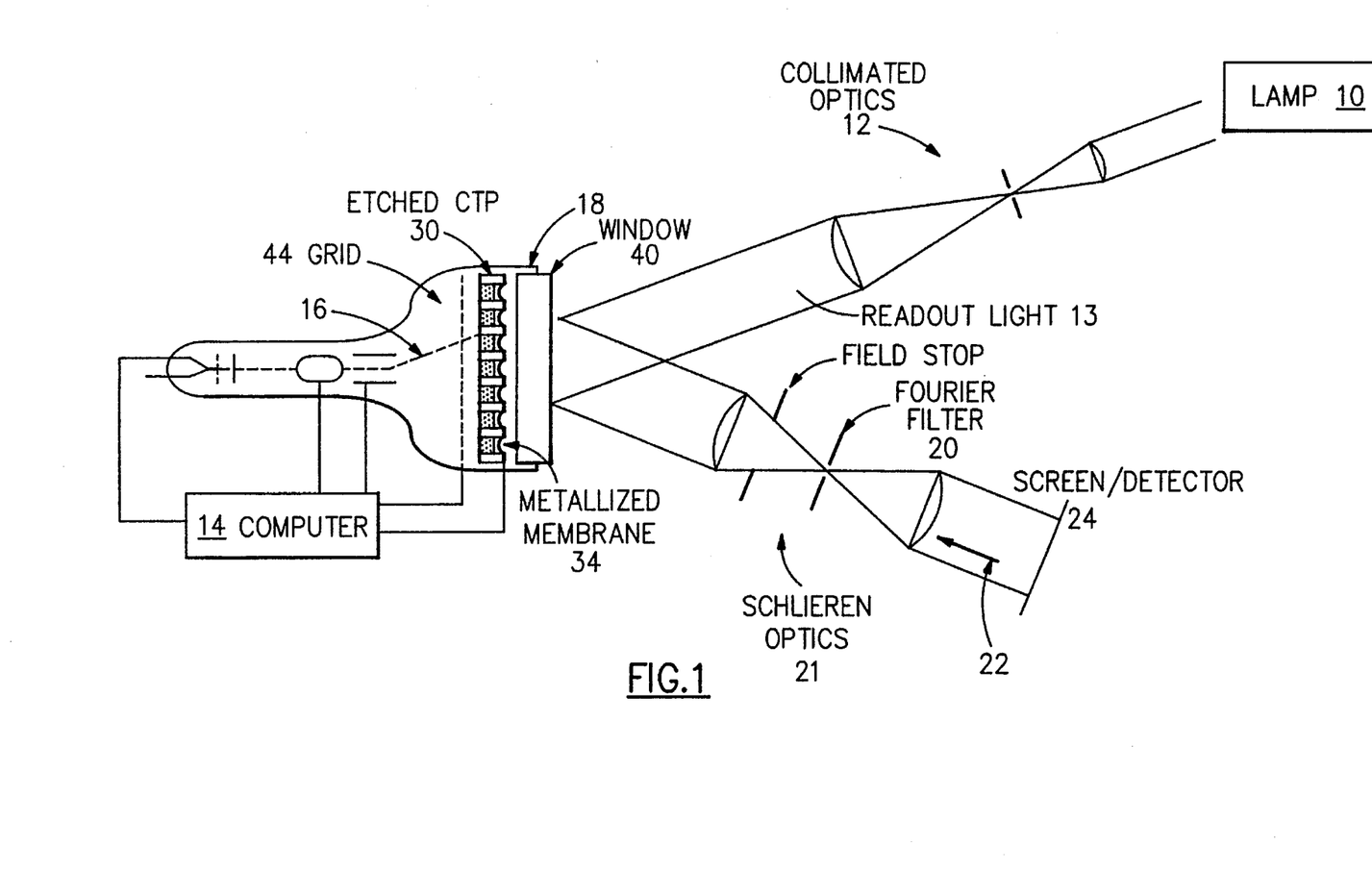
FIG. 1 is a schematic view of an overall system employing an electron-addressed membrane light-modulator (e-MLM) in an image projection system.

A schematic of the projector is shown in FIG. 1. Specifically, it consists of a readout light source 10 of the appropriate wavelength which can be a laser, arc lamp or glowbar, for example. It also includes IR collimating optics generally shown at 12, a computer 14 controlling an electron beam-source 16 addressing a membrane light modulator anode 18. Fourier Transform (FT) spatial filter 20 and an output device, which may be a high gain screen, detector or video camera 24, are provided for viewing the output image. As will be more fully described, the image is impressed onto the mirrored membrane surface 34 of the e-MLM by the video signals of the scanning electron beam 16, and read out by the reflected light as a phase modulation. The phase modulated beam is then converted to a high-contrast, collimated image by the FT spatial filter 20, and displayed in projection.

Figure 2:
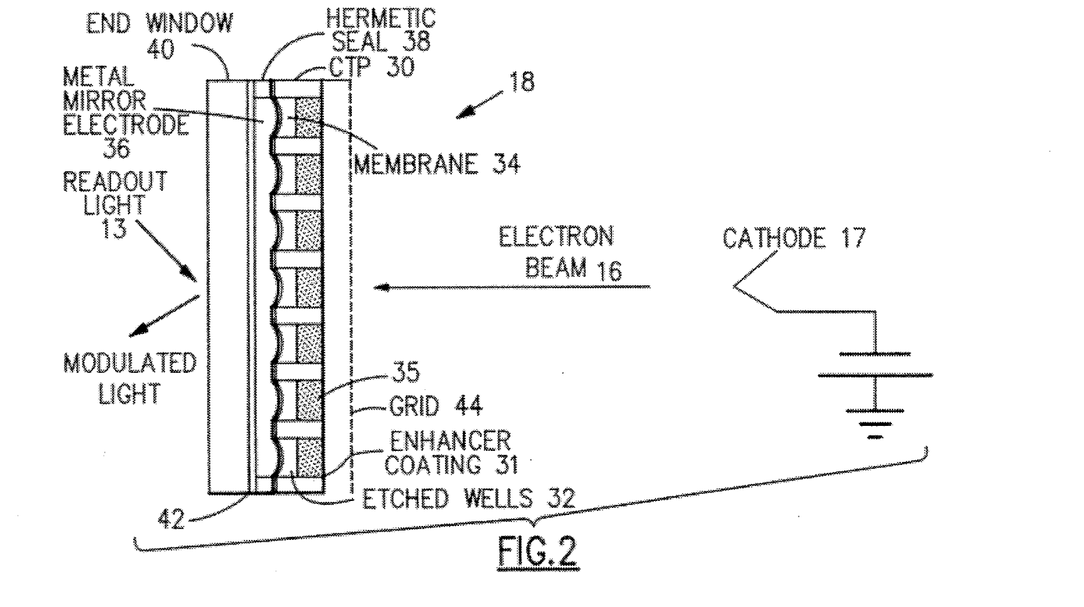
FIG. 2 is a schematic sectional view showing a charge transfer plate, metalized membrane and associated electronic and optical components which is an improvement over that prior art CTP illustrated in the cited 1990 technical digest.

The construction of a prior art membrane light modulator (MLM) anode 18 which has been improved in accordance with one preferred form of the invention is shown in FIG. 2. A membrane is deposited over one surface of a charge transfer plate 30 that is patterned with an array of wells 32 with an addressable electrode 35 at the bottom of each well 32. Thus, the well 32 and its electrode 35 define an individual pixel or resolution element as described in the 1990 technical digest. Additionally, a secondary electron emitter enhancer coating 31 is deposited on the surface of the charge transfer plate that receives the electron signal. The purpose of this coating is to enhance the depletion of charge from the surface so images of either positive or negative charge can be written efficiently. The membrane is coated with a thin electrode material 36 held at a static potential. This electrode material is highly reflecting and also acts as a mirror. A pixel is activated by establishing a potential difference between the well electrode 35 and the membrane electrode 36, causing the membrane to deform into the well region in response to the electrostatic force created by the charge on the pin. Hence, the pixel driving voltage induces a local phase modulation on the readout wavefront 13 reflected by the membrane mirror surface 36. Since pixel wells 32 are close-packed with high spatial uniformity, the membrane diffracts light efficiently when deformed into the wells. By using a schlieren readout scheme (e.g., low pass spatial filter that passes only the zero-order light or a band pass filter that passes only the first-order light), the phase object at the deformed membrane surface may be converted to an intensity image at the screen.

The e-MLM consists of an addressing electron beam 16 and an MLM anode assembly generally indicated at 18, as illustrated in FIG. 2. The anode consists of a metal mesh grid 44 before the pixelated matrix of wells 32, over which the polymeric, metalized membrane 34 is deposited. The membrane is environmentally protected by an hermetically sealed, IR-transmissive end window 40. For use at infrared wavelengths the window material is preferably zinc selenide (ZnSe) or germanium, whereas materials such as glass could be used in the visible and quartz in the ultraviolet. Both sides of the window are anti-reflection (AR) coated to eliminate undesireable light reflected by the window.

Referring still to FIG. 2, the electron beam 16 writes a charge pattern onto the addressing side of the CTP, which is transferred to the bottom of the well by the electrodes 35 as a two-dimensional voltage pattern. The resulting deformed mirror 34,36 phase-modulates the reflected IR readout light 13, which is converted to a projected high-contrast image by the downstream schlieren optics generally shown at 21. (see FIG. 1)

Figure 3:
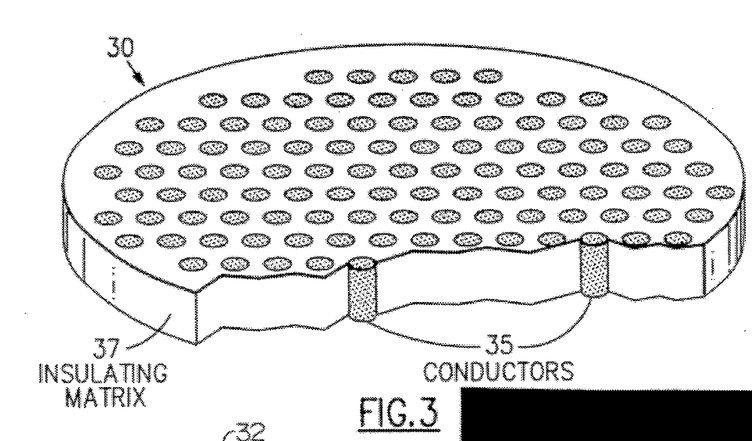
FIG. 3 is a schematic, partial sectional view of one type of charge transfer plate.

The heart of the anode assembly is the pixelated structure, called a charge-transfer plate CTP 30. The name derives from its ability to serve as a high-density multi-feedthrough vacuum interface, transfering a two-dimensional charge distribution from vacuum to air. The CTP, illustrated in FIG. 3, is a wafer of electrically insulating material 37 in which are imbedded a regular matrix of thousands to millions of longitudinally oriented conductive pins 35. The ratio of collective pin cross-sectional area to the CTP area is about 50%. Charge transfer plates with 10 μm diameter pins on 14 μm centers, and 50 μm diameter pins on 70 μm centers are typical. Material may be removed from the pins on one side of the plate so as to form a regular array of recessed wells 32 a few microns deep. The surface is highly polished to an optical flatness of 2λ across the active diameter. Thereafter the enhancer coating 31 is applied to the rear surface of the charge transfer plate by thin film deposition techniques.

Figure 4A:
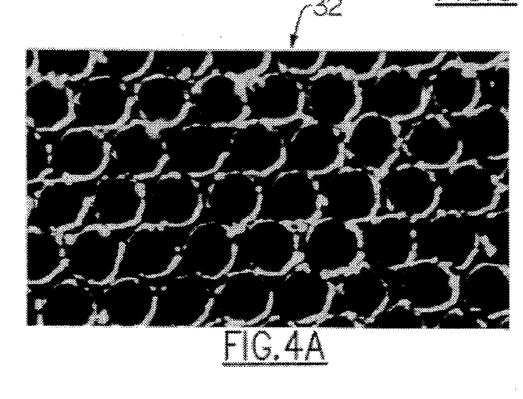
FIG. 4a is a photomicrograph of a metalized membrane overlying a charge transfer plate.
Figure 4B:
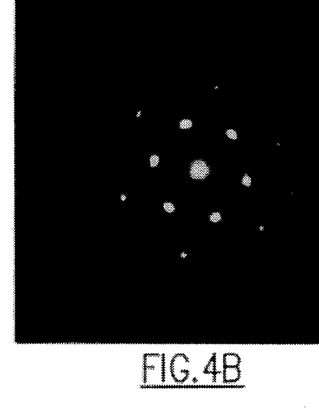

A polymeric membrane 34 is deposited on the CTP surface that contains the wells 32 such that a reliable bond between the two dielectric surfaces is established due to van der Waals forces. The resultant membrane pixels then assume the symmetry of the wells which may be circular pixels on hexagonal closed packed (HCP) centers or circular pixels on square centers, for example. Upon optical readout of the membrane, this symmetry (square or hexagonal) is preserved in the Fourier plane as a diffraction pattern. A high-magnification photograph of the pixelated membrane surface with HCP symmetry and its optical Fourier transform are illustrated in FIGS. 4(*a*) and 4(*b*), respectively.

Referring again to FIG. 2, we see that one means of addressing of the MLM anode is accomplished by directly addressing the (CTP) with a scanning electron beam 16. This approach offers the following advantages:

(1) With the appropriate electron gun drive electronics and high-resolution (e.g., vidicon-type) electron gun, each pixel (pin) of the CTP anode is individually addressable;

(2) The electron beam current of conventional delivery systems can be-large, ranging from tens of nanoamperes to hundreds of microamperes;

(3) A well-established technology standard exists for scanning electron beam imaging systems, as a result of the widescale development of cathode ray tubes and video-based communications (e.g., television).

Electronically, the e-MLM may be viewed as a triode structure, as illustrated in FIG. 2. The thermionic cathode 17 at $V_k<0$ emits a primary electron beam 16 which may be intensity modulated by its video grid (not shown), which strikes a pin 35 (or pins) of the CTP. Secondary electrons are emitted from the enhancer coating 31 overlying the pins and collected by the grid 44, resulting in a buildup of positive charge on the pin 35 if the secondary electrons are collected by the grid. The local potential of the CTP (which influences the landing energy of the primaries) is determined by the membrane potential at $V_m$. The landing energy $E_p$ of the primaries is given by:

$$E_p = e(V_k - V_m).$$

The ratio of secondaries to primaries, or δ, is dictated by the particular value of $E_p$. In the absence of an erase cycle, the throughput (TP) of the e-MLM may be given by:

$$TP \text{ (pixels/sec)} = i_s/CV,$$

where $i_s$ is the secondary current, C the pixel capacitance, and V the potential difference required to deflect the membrane 34 to full-contrast modulation.

The throughput is representative of the signal rate of the e-MLM for information processing. For example, if we desire a 250×250 pixel image framed at 100 Hz, the TP associated with this frame rate is: TP=250×250×100=6.25× $10^6$ pixels/sec. Hence, the secondary electron current required would, given a pixel capacitance of 0.5 pF and a full-modulation voltage of 70 V, be:

$$i_s = TP\ C\ V = (6.25 \times 10^6 \text{pixels/sec})\ (5 \times 10^{-13} F/\text{pixel})\ (70\ V) = 220\ \mu A.$$

This level of primary electron current is readily attainable by conventional CRT-type electron guns.

In the framed mode, the grid 44 is grounded and a potential difference is established between the CTP pins 35 and the grid by applying a negative DC potential to the membrane metalization layer 36, which drives the CTP 35 pins to that potential by capacitive division. As the electron beam 16 scans across a conductive pin 35 of the CTP 30, secondary electrons are emitted from the enhancer coating 31 covering that pin and are collected by the grounded, planar fine mesh grid 44 held in close proximity to the CTP surface. Since the number of secondary electrons emitted per incoming primary electron, or δ, exceeds unity, a net positive charge accumulates on the pin 35. If an enhancer coating 31 is added to the CTP, this increases the charging current $i_s$ according to the increase in of the enhancer material:

$$\frac{i_{s_2}}{i_{s_1}} = \frac{\delta_2 - 1}{\delta_1 - 1}$$

Where $\delta_1$ and $\delta_2$ are the secondary electron emission coefficients without and with the enhancer coating. If the electron beam 16 continues to address that pin, charge accumulates until the pin potential stabilizes to the grid potential, (i.e. ground in this case). During framed operation, the beam current 16 can be constrained such that no pixel is allowed to saturate to the grid potential. Thus, by dynamically varying the electron beam current 16 at each pixel location, a continuously varying two-dimensional charge image can be written onto the conductors 35. This results in a voltage drop between the membrane and the pins and the associated electrostatic force pulls the membrane into the well. Since the pixel capacitances may be on the order of a picofarad, charge storage times can be long (>100s). This necessitates an erase cycle following each write cycle; erasure is easily accomplished by grounding the membrane electrode 36 during electron beam addressing.

The device may then be read out by reflecting collimated light off the deformed membrane at a shallow (~10°) angle of incidence, as indicated in FIG. 1. Alternatively, it may be read out at normal incidence with the use of a beam splitter. The phase information encoded upon the reflected wavefront is then processed by Schilieren optics, shown generally at 21 in FIG. 1. The schlieren system 21 consists of a converging lens, a spatial filter 20 and a reimaging lens as illustrated in FIG. 1. The converging lens yields the Fourier transform (FT) of the phase object (i.e., the deformed membrane surface) one focal length after the lens. The FT is a diffraction pattern consisting of bright spots of light that possess the symmetry of the CTP, as illustrated in FIG. 4(*b*) for a HCP symmetry. For a fully undeformed membrane surface, only the zeroth, or specular, order is present in the FT plane. As pixels are deformed, the diffraction efficiency into the higher orders increases. In the preferred zeroth-order readout scheme an intensity-modulated image of the phase object is obtained by passing only the zeroth order of the FT through the spatial filter before reimaging with the second lens. This output image is both collimated and parfocal, and can be displayed onto a screen with variable magnification by a subsequent projector lens. As expected, the zeroth-order readout results in a contrast-reversed image, i.e., black pixels on a white field.

A most important aspect of manufacturing the e-MLM is the fabrication of the pixel structures on the readout side of the MLM anode. As indicated in FIG. 2, one method of forming pixel structures is by etching away portions of the CTP pins 35, leaving the perforated insulating substrate 37 as a support structure for the reflective membrane 34. While this prior art method of producing the "mirror" pixels has proved satisfactory it can be improved. One method has been mentioned above when the secondary emission of the electron impact surface has been increased by use of the enhancer coating 31. Another problem is that the periodicity of the CTP 35 pins may not be perfect. Accordingly, periodicity of the membrane pixels 32 would not be perfectly periodic. This lack of regularity leads to high spatial frequency, static 'noise' in the reconstructed image. Another related problem is that of image contrast. Since image contrast in a schlieren imaging system is attained by-interference at the image plane, the apparent pixel fill factor is of extreme importance. For example, approximately 50% pixel fill factor is necessary in order to achieve a perfect intensity null in an anode with HCP pattern of pixels.

Another issue is that of dynamic range. In order to modulate long-wavelength light, membrane deflections of several microns may be required. In order to enhance speed, low voltage operation is preferable. To meet these requirements, the ratio of pixel diameter to pixel well depth must be large. For example, it can be shown that the membrane deflection can be expressed by:

$$\delta = (\epsilon_o/32) \, TV^2 \, (a/D)^2,$$

where $\delta$ is the membrane deflection, $\epsilon_o$ the permittivity of free space, T the membrane surface tension, V the applied voltage, a the pixel diameter, and D the pixel well depth. Therefore, larger deflections and/or lower operating voltages will be attained by increasing the a/D ratio of the pixel geometry. In addition, the maximum deflection required for device operation should be a fraction (<20%) of the total well depth in order to preserve the Parabolic shape of the deflected membrane. This represents about half of the deflection range of the membrane pixel. Since larger deflections require deeper wells, while low voltage operation implies shallower wells, the optimization of pixel well depth (or a/D ratio) can be determined empirically. This provides the ability to continuously vary the geometry of the pixel array and achieves the optimization of device performance.

As discussed above, a most important aspect of manufacturing the e-MLM is the fabrication of the pixel structures of the MLM anode. FIGS. 2, 5, 8, 10, 11 and 12 show a variety of different anode pixelization schemes. In the FIG. 2, for example, the prior art construction pixelization is provided by the CTP on both the addressing side and readout side of the CTP. The pixel well structures are formed by etching away a few microns of the CTP pins 35, leaving the perforated insulating substrate 37 as a support structure for the membrane 34. Therefore, the structure of the membrane pixels 32 is tied to that of the CTP, in pixel diameter, pixel pitch, periodicity, packing density, and so on. As mentioned this form of the invention includes the improved enhancer coating 31.

Several superior architectures can be employed that decouple the pixel array from the CTP inter-pin pitch. One such improved architecture is illustrated, for example, in FIG. 5. In one such case, the membrane pixels 32 are created by patterning an image thereof onto a thin dielectric film 58 coating the face of the CTP 30 via photolithographic techniques. In this process a dielectric film is deposited on the face of the CTP with conventional spin coating or vacuum-deposition techniques. The uniformly thick 2–10 μm coating is overcoated with photoresist which is then exposed by UV light through a mask. After developing the photoresist, the unwanted dielectric material is removed via plasma etching or wet etching to produce a regular array (e.g. rectangular or hexagonal) of say, 100 μm diameter circular pixels on a 138 μm pitch assuming a 70 μm CTP pin pitch. A layer of metal 56, 1000 angstroms thick is then deposited over the remaining surface. When the photoresist is stripped, the remaining metal pattern 56 defines circular pads at the bottom of each pixel by the metal lift-off technique.

Figure 5:
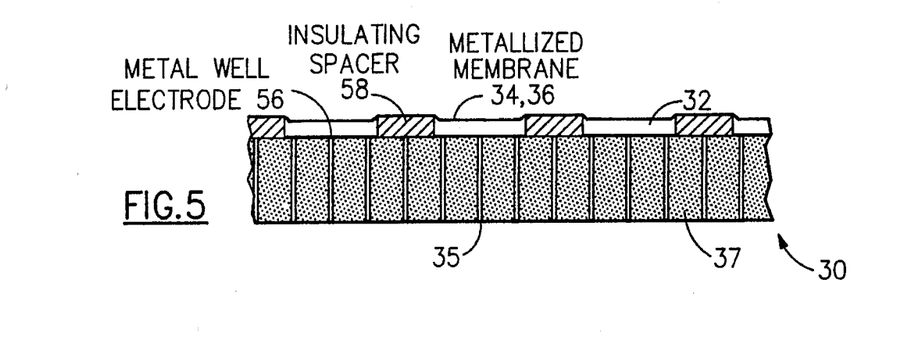
FIG. 5 is a schematic sectional view of a preferred form of the invention.

The dielectric layer 58 has good mechanical properties and provides a smooth surface for membrane attachment. The immediate benefits of this process are twofold: first, the pixel periodicity and lattice geometry are of the highest quality due to established mask-making techniques and alignment procedures. This removes fixed-pattern noise from the schlieren optics image plane. Second, the pixel fill factor, pixel pitch, and well depth are adjustable in a defined fashion, allowing the structure to be optimized for specific optical wavebands and various applications.

EXAMPLE I

Figure 6:
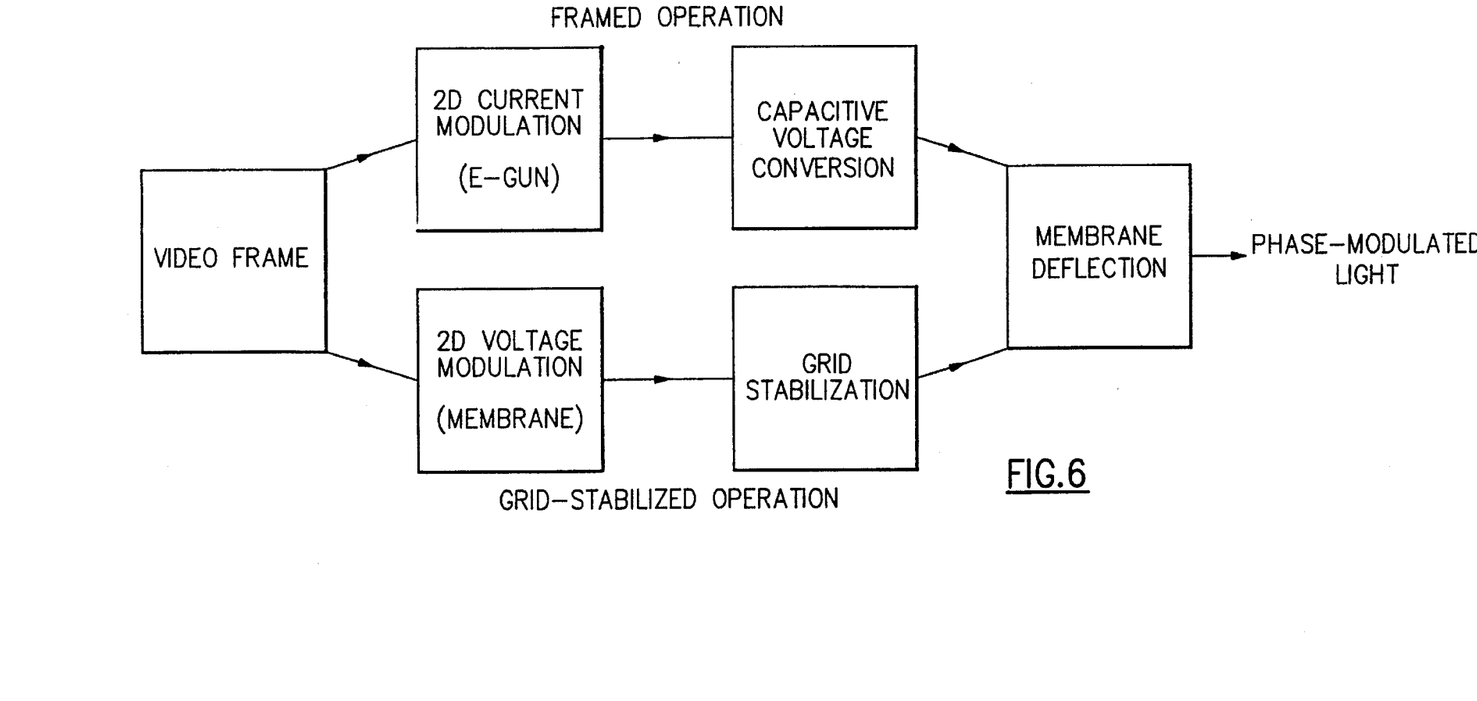
FIG. 6 is a block diagram of a comparison between grid stabilized and framed video operation of the e-MLM.

In one preferred form of the invention of FIG. 6, the charge-transfer plate is made according to the methods described in U.S. Pat. No. 4,863,759. The plate is then polished to an optical finish and coated with a polymer (for example polyether-imide) to obtain, say, a 3 μm dielectric layer. The polymer is then overcoated with, say, a 2 μm layer of positive photoresist. The photoresist is soft-baked and exposed to a collimated UV beam passed through a high-contrast mask. After exposure, the photoresist is developed and the CTP is placed in a plasma chamber. Pixel wells are formed by the removal of polymer material where no photoresist remains. After removal from the plasma-etch chamber, the CTP structure is placed in a vacuum coater where a metal layer 56 is deposited by e-beam or thermal evaporation. Typically 1000 angstroms of aluminum can be deposited. Upon removal from the vacuum coater, the remaining photoresist is stripped, causing the metal pattern 56 to remain only in the bottom of the pixel wells.

The metalized membrane, preferably parylene 34, grown by plasma polymerization by Lebow Co. for example, is coated with metal 36 prior to attachment to the support substrate. Silver is usually employed as the reflective metal, though other environmentally-robust metals can also be used. The membrane is attached by slowly bringing it into contact with the substrate under 'tip/tilt' control. The adhesion is due to van der Waals forces which depend on materials parameters of both the substrate and the membrane.

To optimize the characteristics of the membrane mirror, including its zeroth order reflected energy content in the undeflected state, the membrane or underlying substrate may be composed of materials that reduce the tension in the membrane or that reduce the rest-state deflection of the membrane through materials parameters such as Young's modulus of elongation. Alternative membrane materials such as nitrocellulose, polyether-imide, polypropylene, PTFEP, (poly [bis(trifluoroethoxy)-phospazene]), polyimide, polyimide siloxane, or PET (polyethylene terephthlate) may optimize the actual device performance and are compatible with the process outlined here. Several substrate materials are similarly compatible with this process, including: polyimide, novolac resins, and PTFEP.

Alternative processes include direct patterning of photosensitive polymers (UV-curing adhesives, photosensitive polymide, or photoresist) and similar patterning of vacuum-deposited (evaporated or sputtered) dielectric films (such as ZnS, $MgF_2$, $SiO_x$, $y_2O_3$, or cryolite).

In summary, this improved approach for pixel construction on the MLM anodes has the following advantages:

- Improved contrast due to reduced rest-state membrane pull-back.
- Enhanced pixel-to-pixel uniformity of response by improving the uniformity of the pixel geometry. Reduced or eliminated fixed-pattern noise from the image by achieving a high degree of periodicity in the pixel array.
- Improved image contrast to at least 200:1 by 'tuning' the pixel fill factor.

Phase dynamic range tailored to the specific waveband of interest by controlling the ratio of pixel diameter to pixel well depth.

Due to the efficient charge storage characteristics of the CTP, considerable image storage times (>$10^3$ sec) have been observed in the e-MLM. Thus, conventional video operation would imply a frame erase after each video field. Since this is wasteful of charge, and also results in non-negligable image flicker, the flickerless mode of operation is preferred. While the conventional video addressing approach described above applies the video signal to the electron gun control grid in order to modulate the delivered beam current, it is also possible to apply the video signal directly to the membrane instead. Thus, the electron beam current will be fixed and simply scanned across the MLM anode at video rates. The potential difference across each pixel well will thus be determined by the instantaneous potential applied to the membrane when the electron beam is impinging on that pixel, since the pixel pin electrode stabilizes to the grid potential by the secondary emission process. Such a process is referred to as grid-stabilized operation. A similar scheme has been successfully employed in the operation of the Sodern light valve to eliminate flicker from the display. The differences between framed operation and grid-stabilized operation are illustrated in FIG. 6.

Apart from the absence of image flicker, the grid-stabilized mode of operation is more charge-efficient than standard video operation by up to a factor of two.

In addition to the field of IR target simulation and scene generation, further developments of this class of device present distinct advantages to many areas and systems of significant interest to the military. Important application areas of the device include: high-definition flight simulator displays, infrared scene projection, laser beamsteering and wavefront correction in optical communications and imaging through turbulence, high-intensity large-format displays for $C^3I$ and teleconferencing, robotic vision, autonomous vehicle guidance, pattern recognition, parallel processing of large knowledge bases, multispectral image fusion, neural-network-based processing, and industrial inspection. It is the unavailability of low-cost, high resolution, high brightness SLMs that is impeding the development of all areas of optical signal processing and other specialized optical systems such as joint correlators and industrial inspection systems. Concerning the multi-billion-dollar display market, this technology can benefit the high-definition large-format projection displays for television conference rooms, auditoriums and the home.

Figure 7:
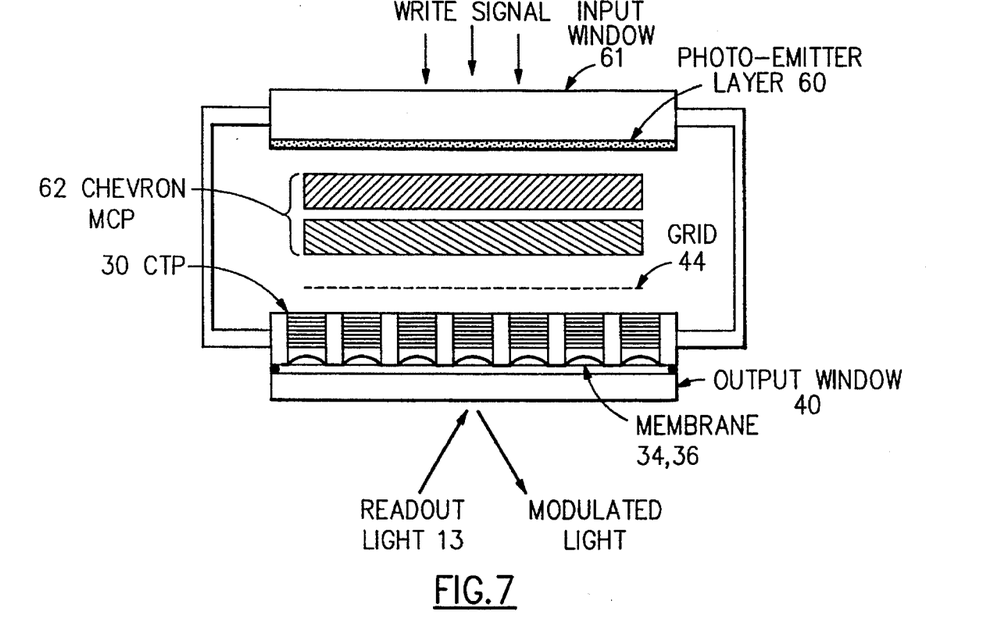
FIG. 7 is a diagram of an optically-addressed form of the invention, utilizing a photocathode and an electron multiplier assembly a set of microchannel plates to produce the necessary charge image as input to the MLM anode assembly.

While one embodiment of the invention has been described above wherein an electron beam is scanned across the rear of the transfer plate to create an image modified spatial charge on the light modulating membrane, other methods of creating the space charge image can be utilized as shown in FIG. 7. In this case, the write signal is an image incident on a photo-electron emitting layer 60 carried on an input window 61. This photo-electron emitting layer 60 emits an image modified stream of electrons through an electron multiplier assembly shown here as a set of microchannel plates (MCP) 62 which transfers the amplified stream of electrons to the rear of the charge transfer plate 30 operating under the influence of grid 44. This anode structure is preferably made in accordance with the present invention. The charge is transmitted to the front thereof; the resultant electrostatic forces deform a membrane 34, 36 whose image-modified deflection is read through an output window 40 by suitable readout beam. This general arrangement of elements is similar to FIG. 18 of the above mentioned U.S. Pat. No. 4,794,296 owned by the assignee of this application.

Figure 8:
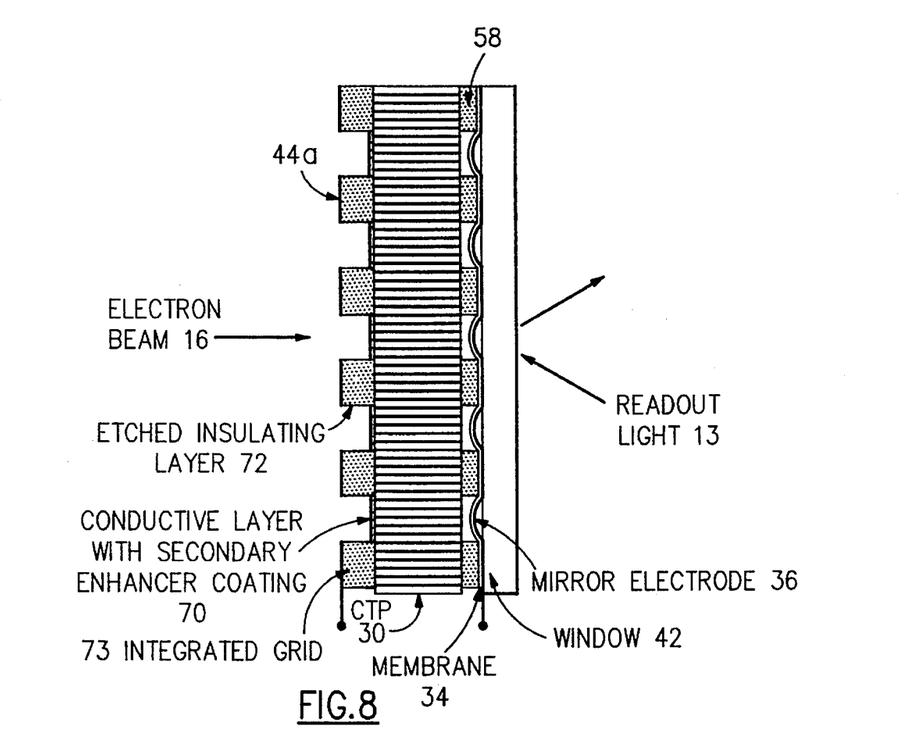
FIG. 8 is a form of the invention, similar to that of FIG. 5, except that the electron beam-addressing side of the CTP is patterned so as to realize an integrated grid in registration with the readout side in order to provide improved charging efficiency of the pixel electrodes, and reduce crosstalk between pixels.

Another embodiment of the present invention provides a modified grid arrangement on the rear of the charge transfer plate 30. As shown in FIG. 8 an electron beam 16 strikes secondary emitting portions 70 on the rear of the charge transfer plate. The impacting electrons cause a large emission of secondary electrons which are then collected by a modified grid 44a which is formed on insulated pedestals 72 created by masking techniques similar to the photolithographic masking techniques discussed above for forming the front surface insulating spacer walls 58 in FIG. 5.

Figure 9:
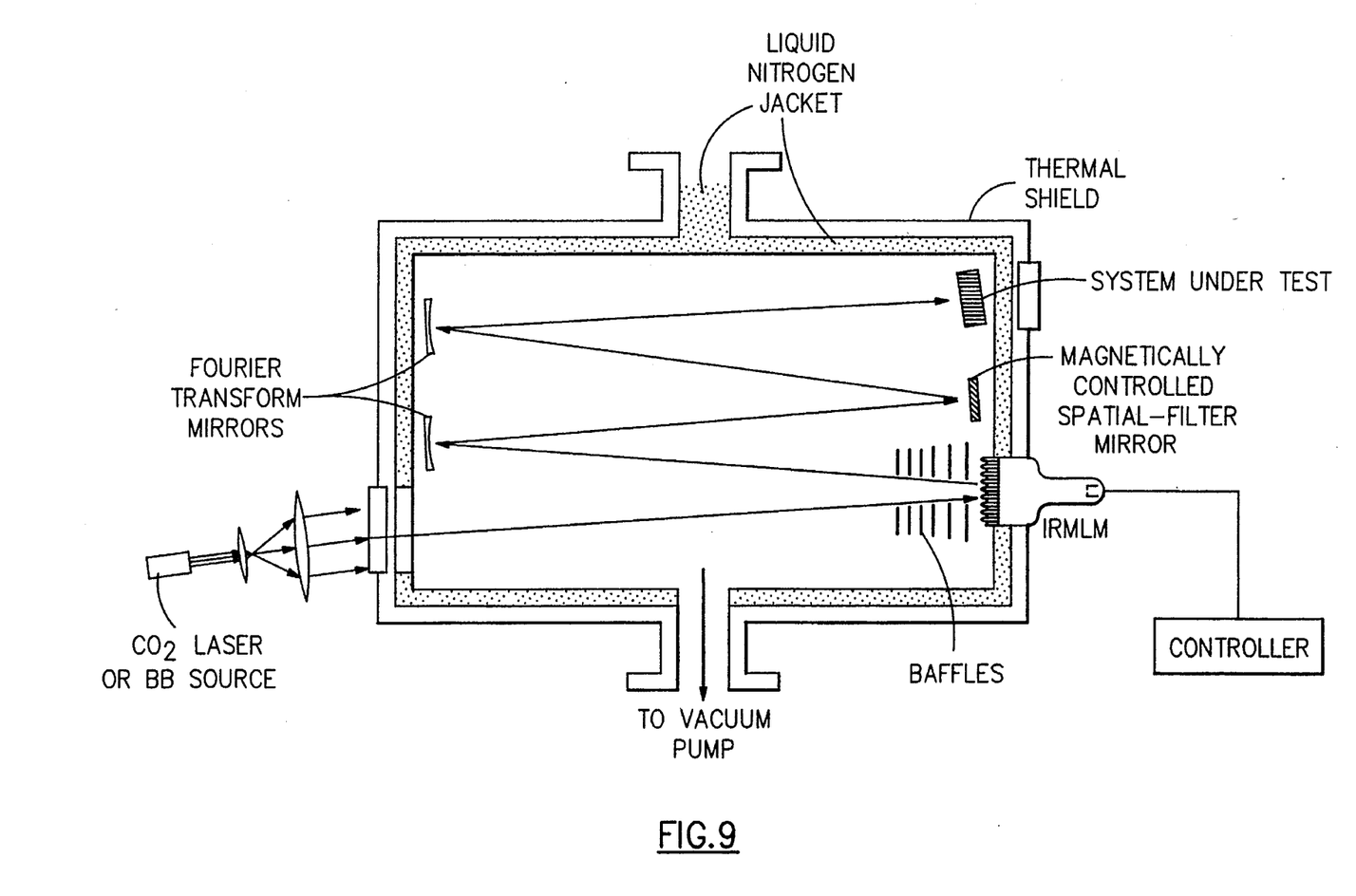
FIG. 9 is a version of FIG. 1 modified to accommodate long-wavelength IR projection which requires cryogenic cooling of the system.

In those situations where the light to be modulated has a very long wave length (e.g. 8–14 μm) it is necessary to provide a liquid nitrogen cooled jacket to surround the whole system so as to suppress background infrared radiation that could interfere with and mask the IR image being processed by the system. Such a shielded system is shown in FIG. 9.

In the above discussion of the preferred form of the invention, the electron stream or beam addresses the rear surface of the charge transfer plate, and the front of the charge transfer plate carries the metalized membrane mirror which is selectively deflected by the charge transferred through the plate.

Figure 10:
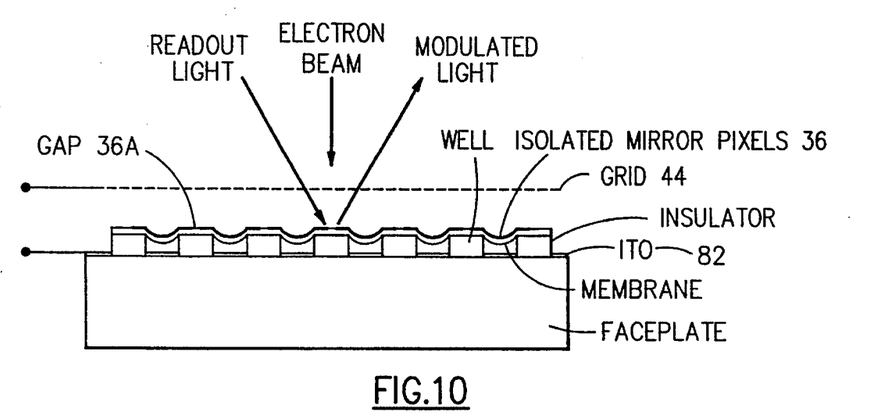
FIG. 10 is a form of the invention in which an insulating substrate (face plate) used in lieu of a CTP. In this form, the electron beam-addressing and the optical readout are achieved on the same face of the device.

In a further modification of the invention the electron beam impinges directly on the metalized membrane of an anode structure that does not necessarily employ a charge transfer plate. In this case, each portion of the mirror constituting an isolated pixel is insulated from each other pixel so that an isolated charge can be created at each pixel. This modification is shown in FIG. 10. where the electron beam strikes the metalized isolated mirror overlying the pixel potential wells. The isolation of the mirror 36 is achieved by gaps 36a in the coating 36. Secondary emission of electrons will create a static charge on the insulated mirror 36 in accordance with the intensity and energy of the electron beam. This static charge will then create deformation of the membrane in direct accordance with the charge carried thereby in the same fashion as the deformation of the membrane as discussed in connection with FIGS. 2 and 5. In this case, the structure could be essentially the same as described for FIG. 5 with the exception that the metalized mirror 36 would have gaps 36a electrically isolating each portion of the metalized mirror overlying the individual pixels.

In FIG. 10, the readout light is directly impinged on the mirror surface through the envelope surrounding the source of the electron beams.

Figure 11:
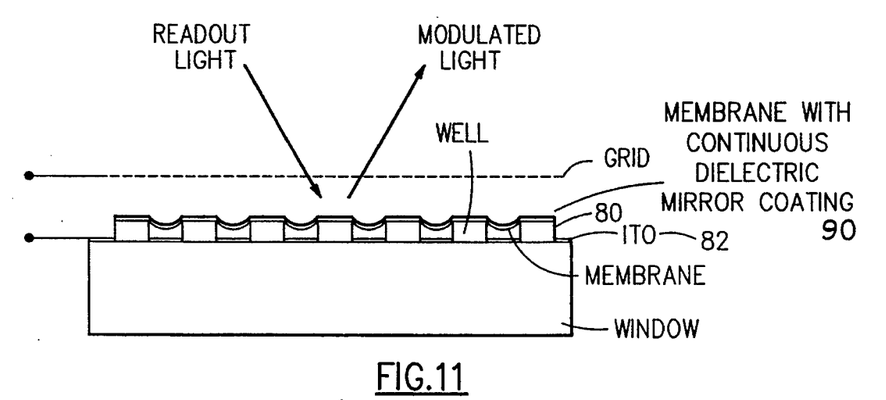
FIG. 11 is a form of the invention similar to that of FIG. 10, except that rather than a discontinuous metal mirror coating on the membrane, a uniform dielectric mirror is coated onto the membrane.

In FIG. 11, a similar embodiment of the invention is shown wherein, instead of having individual metal mirror coatings, the reflective surface is created by a dielectric mirror 90 such as a multiple alternating layer stack of $SiO_2/TiO_2$. In this case, electron beam impingement charges the dielectric mirror 90 negatively or positively and concentrates the charge at the point of impact of the electron beam. Accordingly, the pixels will accumulate an amount of charge depending on the beam current, the dwell time of the electron beam, and the secondary electron emission coefficient in the case of positive charging. Thus the membrane will be deflected into the potential wells in accordance with the charge carried thereon.

Figure 12:
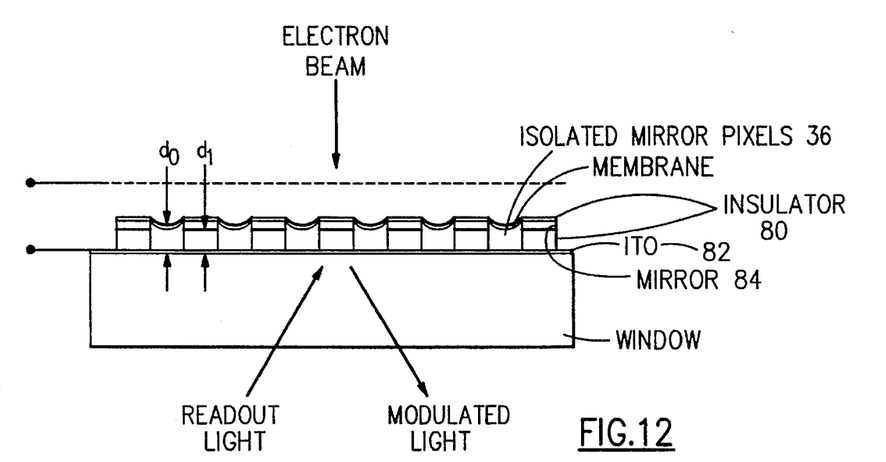
FIG. 12 is a form of the invention similar to FIG. 11, except the device is addressed and read out on opposite sides of the substrate. This is achieved by use of a mirror layer embedded within the insulative well structure.

A similar system is shown in FIG. 12 but in this case the readout light is beamed through the support window to the mirror. Note that a charge transfer plate cannot be used as the membrane support since the membrane substrate must be transparent. In FIG. 12, a stack of two transparent insulators 80 defining the potential wells is mounted on a transparent electrode 82, such as an indium tin oxide layer, and mirror surfaces 84 are provided between these insulators 80. The isolated mirror pixels 36 are then supported on top of the second insulator stack 80 provided above the mirror surfaces 84. In this case, readout light is modulated in accordance with the degree of deformation of the individual mirror pixels into the potential wells. The contrast ratio of the modulation is dependent upon the relative position of the membrane mirror pixels referenced to the mirror surfaces within the insulators.

Figure 13:
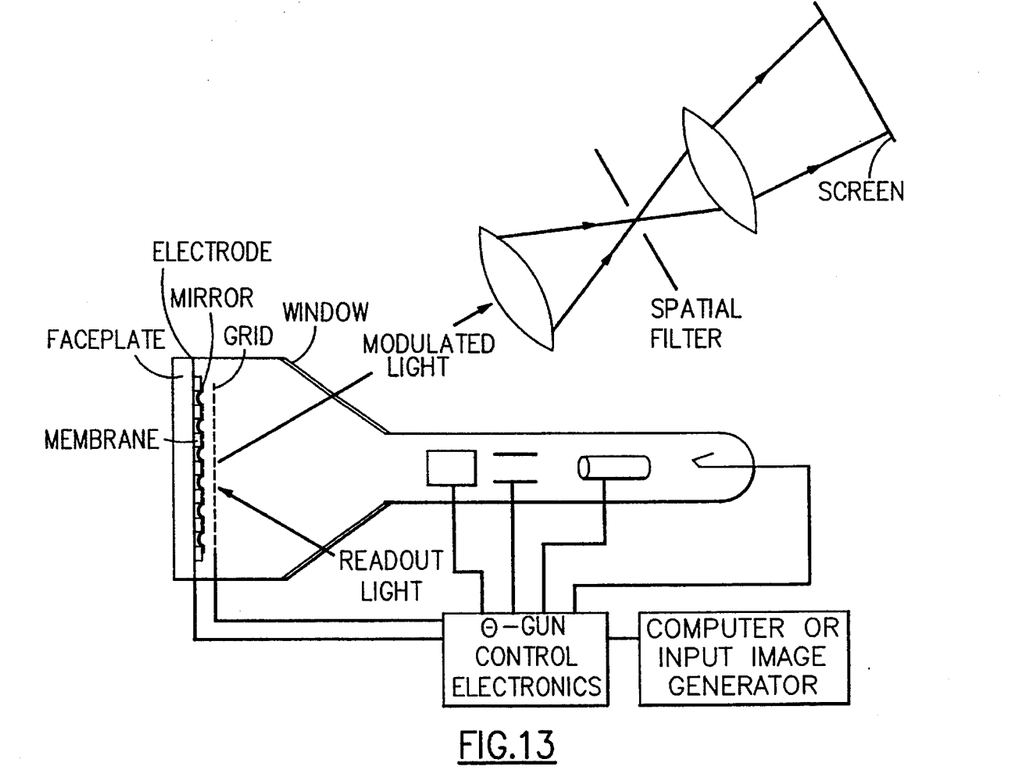
FIG. 13 depicts the electron gun tube enclosure and readout optics which would be used with the device anode architectures of FIGS. 10, 11, or 12 in those cases where the electron beam and optical readout may occur upon the same surface of the well structure.

In FIG. 13 there is shown a schematic assembly of a readout optical system and a modified electron beam addressed membrane spatial light modulator which directs an image modified electron beam directly on the mirror membrane anodes as illustrated in FIG. 10, or 11.

While several modifications of the invention have been described above where an electron beam cathode ray tube scans the charge transfer plate or the mirrored membrane directly, it is also possible to utilize a source of electrons from a field emitter array which can be electronically addressed. Such a field emitter array is shown in the copending application Ser. No. 07/638,317 filed Jan. 4, 1991 and owned by the assignee of the present invention. Similarly, the charge transfer plate can be directly wired by a suitable electronic controller having addressing wires which directly couple to the rear surface of the charge transfer plate. Examples of these two systems are shown in FIGS. 14 and 15.

Figure 14:
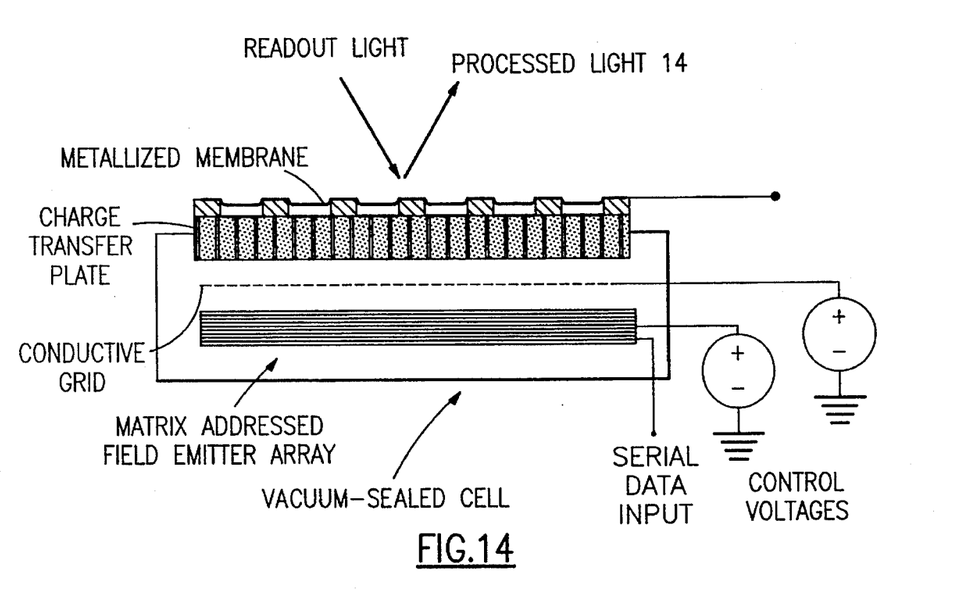
FIG. 14 illustrates a form of the invention which utilizes a field emitter array to produce the necessary charge image on the charge transfer plate.

FIG. 14 shows a field emitting source of electrons which impact any of the anode structures of FIGS. 2, 5, 8 or 12 of the present invention.

Figure 15:
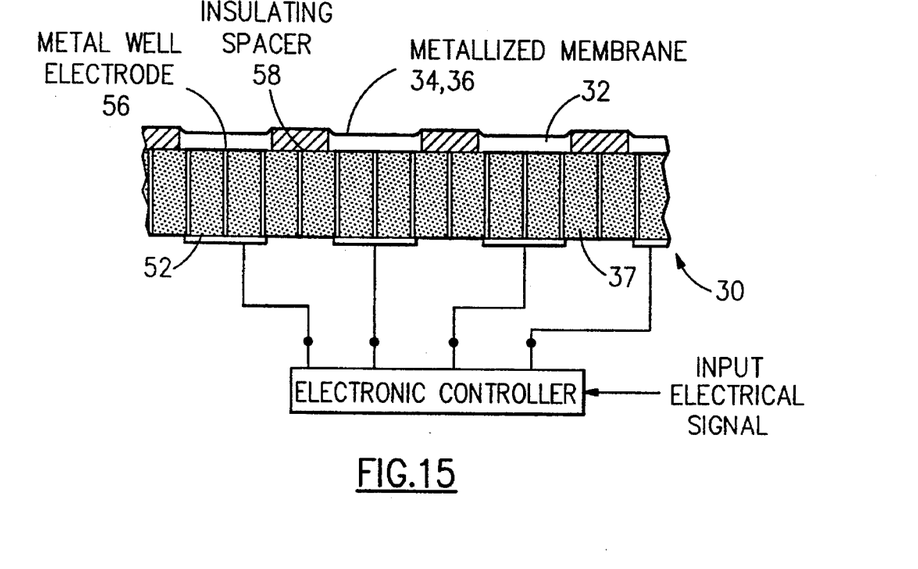
FIG. 15 illustrates a form of the invention wherein the charge transfer plate pixels are hard wired to an electronic controller.

In the direct wired configuration shown in FIG. 15 an electronic controller drives each of the pixels by means of discrete metal electrodes provided on the rear side of the charge transfer plate. The other (mirror) side of the charge transfer plate is made in accordance with the present invention.

In FIG. 15 the charge transfer plate anode is preferably made as shown in FIG. 5.

From the above description, it should be apparent that the novel charge transfer plate of the present invention can be used in a wide range of applications wherever spatial light modulation is desired. The input to the membrane anode structure charge transfer plate may be derived from a vast number of different types of electron sources and scanning can be achieved in numerous ways as described above.

Figure 16:
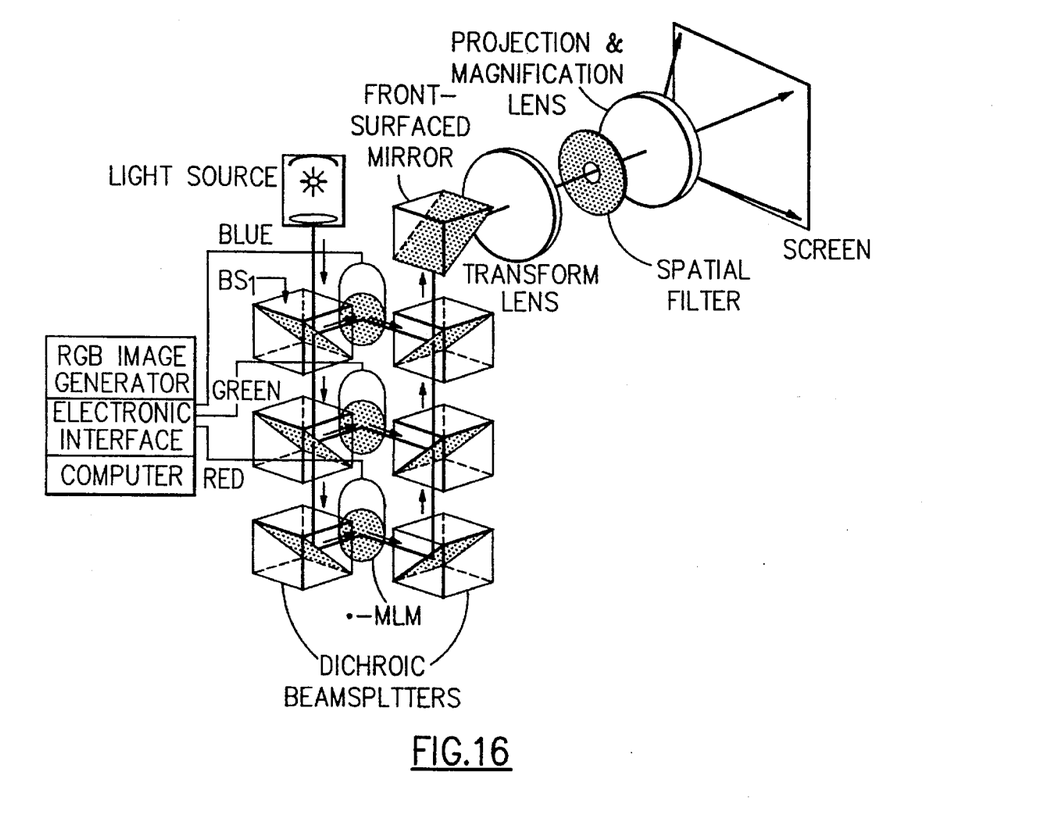
FIG. 16 shows the use of the electron addressed membrane light modulator (e-MLM) to achieve three color projection video.

An improved high-definition electron-beam-addressed Membrane Projection Display (MPD) System is illustrated in FIG. 16 as a three color projection television system. It is comprised of three subsystems as shown: (a) three electron-beam-addressed Membrane Light Modulators (e-MLMs) with their common readout light source and dichroic beam splitters, (b) a spatial filtering and projection optical system and (c) an electronic control and computer interface subsystem which performs the necessary image format conversions and implements the control functions that allow the microprocessor to control the light valve.

In operation, white light from the arc lamp is fed into the optical system consisting of the three dichroic beamsplitters (BS1, BS2, and BS3) that extract the blue, green, and red light components, respectively, for readout of the three e-MLMs as shown in FIG. 16. Thus e-MLM1, for example, which is driven by the blue component of the electronic video signal, phase modulates only the blue component of the image as it reflects from the deformable membrane mirror surface e-MLM1. Similarly, the modulators e-MLM2 and e-MLM3 modulate the green and red components of the readout beam. The modulated zero-order components of the blue, green and red light are recombined by the second set of dichroic beamsplitters (see FIG. 16) to yield the phase modulated three color signal beam.

While numerous modifications of the invention have been described, many additional forms thereof will be apparent to one skilled in the art and the invention is not to be limited to the specific forms shown.

We claim:

1. A system for modulating incident light by impinging said light on a membrane mirror which can be deformed in accordance with an electric charge on individual pixel portions of the membrane mirror;

the improvement wherein the membrane is supported on a plurality of insulating walls which are formed on an electrode-containing surface to define potential wells, each said potential well constituting a pixel so that the bottom of each of said wells has said electrode surface thereon and a charge difference can be created between the electrode and the portion of the membrane overlying each pixel, and means for creating an image defining charge difference across said membrane by addressing said membrane by impinging upon one side of said membrane with an image modified electron stream, each of said plurality of insulating walls including two transparent insulators and a mirror surface interposed between said two insulators, said insulating walls being mounted on a transparent electrode, said incident light to be modulated impinging upon the side of said membrane opposite to said one side.

2. The system of claim 1 wherein a grid is adjacent that side of said membrane addressed by said electron stream.

3. The system of claim 1 wherein the mirror membrane comprises discrete mirror segments overlying each pixel, and said electron stream impinges on said mirror membrane and modifies the charge on each pixel by secondary electron emission from said mirror segments.

4. The system of claim 1 wherein said mirror membrane comprises a dielectric coating and said electron stream impacts said dielectric coating and modifies the charge on each pixel by accumulation or depletion of electrons thereof.

5. The system of claim 1 wherein said stream of electrons comes from a matrix addressed field emitter array.

6. The system of claim 1, and further comprising a photocathode and microchannel plate assembly for generating said electron stream.

7. The system of claim 1, and further comprising a cathode ray tube for generating said electron stream.

8. The system of claim 1, wherein the mirror membrane comprises discrete mirror segments overlying and spaced from said pixels, said spacing being selected to provide a predetermined contrast ratio of modulation of said incident light.

9. The system of claim 1, wherein said transparent electrode comprises a layer of indium tin oxide disposed upon a transparent window.

* * * * *